United States Patent
Chen et al.

(10) Patent No.: US 7,102,885 B2
(45) Date of Patent: Sep. 5, 2006

(54) MOUNTING APPARATUS FOR DATA STORAGE DEVICE

(75) Inventors: Hsuan-Tsung Chen, Tu-Cheng (TW); Ying Sin William Tin, Shenzhen (CN); Pin-Shian Wu, Tu-Cheng (TW)

(73) Assignee: Hon Hai Precision Industry Co., Ltd., (TW)

( * ) Notice: Subject to any disclaimer, the term of this patent is extended or adjusted under 35 U.S.C. 154(b) by 209 days.

(21) Appl. No.: 10/953,097

(22) Filed: Sep. 29, 2004

(65) Prior Publication Data
US 2005/0094369 A1    May 5, 2005

(30) Foreign Application Priority Data
Oct. 31, 2003    (TW)    ............... 92219404 U

(51) Int. Cl.
*H05K 5/00*    (2006.01)
(52) U.S. Cl. ...................................... 361/685
(58) Field of Classification Search ............... 361/683, 361/684, 685, 272; 312/223.1, 223.2, 352
See application file for complete search history.

(56) References Cited

U.S. PATENT DOCUMENTS

| 5,510,955 | A | 4/1996 | Taesang et al. ............. 361/685 |
|---|---|---|---|
| 6,171,120 | B1* | 1/2001 | Bolich et al. ............... 439/157 |
| 6,418,011 | B1* | 7/2002 | Omori ........................ 361/683 |
| 6,813,148 | B1* | 11/2004 | Hsu et al. ................... 361/685 |
| 2002/0006030 | A1* | 1/2002 | Evanson et al. ............ 361/724 |
| 2003/0058612 | A1* | 3/2003 | Liu et al. .................... 361/685 |

* cited by examiner

*Primary Examiner*—Lisa Lea-Edmonds
*Assistant Examiner*—Corey Broussard
(74) *Attorney, Agent, or Firm*—Morris Manning & Martin LLP; Tim Tingkang Xia, Esq.

(57) ABSTRACT

A mounting apparatus for securing data storage devices (10) includes a drive bracket (20), a number of first locking devices (30), a second locking device (40), and a spring (60). The drive bracket includes a first sidewall (21) defining a pair of grooves (29) for slidably receiving studs (15) of the data storage devices. The first locking device is pivotally mounted on the first sidewall, the second locking device is movably attached to the drive bracket and moves corresponding to the first locking device. The spring connected the first sidewall and the second locking device. When the studs of the data storage device are slid into the grooves, one of the studs is slid into the cutout and sandwiched between the cutout and the end of said groove, thereby securing the data storage devices within the drive bracket.

15 Claims, 7 Drawing Sheets

MOUNTING APPARATUS FOR DATA STORAGE DEVICE

BACKGROUND OF THE INVENTION

1. Field of the Invention

The present invention relates to mounting apparatuses for data storage devices, and particularly to a mounting apparatus for readily attaching data storage devices to a drive bracket.

2. Description of the Related Art

Various data storage devices are installed in a computer for communication and processing data. Conventionally, a computer data storage device is directly secured to a bracket of the computer using screws. Installation and removal of screws requires a tool. This is unduly complicated and laborious, and reduces the efficiency of assembly in mass production facilities.

A common way to overcome the above shortcomings is to have a pair of rails formed in opposite side walls of a bracket. Such rails are disclosed in U.S. Pat. No. 5,510,955. A bracket has two pairs of leader rails on opposite sides thereof. Each pair of leader rails defines a pair of first coaxial holes. A pair of guide rails is respectively attached to opposite sides of a data storage device with bolts. Each guide rail comprises a pair of flanges defining a pair of second coaxial holes. The assembly of the storage device and the guide rails is received in the drive bracket by sliding the guide rails along the leader rails. A pair of locking studs is then inserted through the first and second coaxial holes to thereby secure the storage device within the bracket. However, mounting the rails to the data storage device with bolts is still unduly complicated and time-consuming. Furthermore, the bracket can only accommodate one storage device therein.

Thus, an improved mounting apparatus for data storage devices which overcomes above-mentioned problem is desired.

SUMMARY OF THE INVENTION

Accordingly, an object of the present invention is to provide a mounting apparatus which readily allows attachment and removal of a data storage device to and from a chassis.

To achieve the above-mentioned object, a mounting apparatus in accordance with a preferred embodiment of the present invention is adapted to mount a data storage device defining a plurality of studs in a computer bracket. The mounting apparatus comprises a drive bracket, a number of first locking devices, a second locking device, and a spring. The drive bracket comprises a first sidewall and a second sidewall defining a pair of grooves for slidably receiving the studs of the data storage device. The first locking device is pivotally mounted on the first sidewall, and the first locking device comprises a post and a cutout corresponding to the grooves of the bracket. The second locking device is movably attached to the drive bracket, the second locking device defines a plurality of horizontal apertures, and the posts of the first locking devices are slidably received in the horizontal apertures. The spring connects the first sidewall and the second locking device. When the studs of the data storage device slide in the grooves, one of the studs moves into the cutout and is restrained therein, thereby the data storage device is secured within the drive bracket. When the second locking device is pressed downward to move the first locking device away, the studs are released from the cutout of the first locking device and thereby the data storage device is able to be removed from the drive bracket.

DETAILED DESCRIPTION OF THE INVENTION

Figure 1:
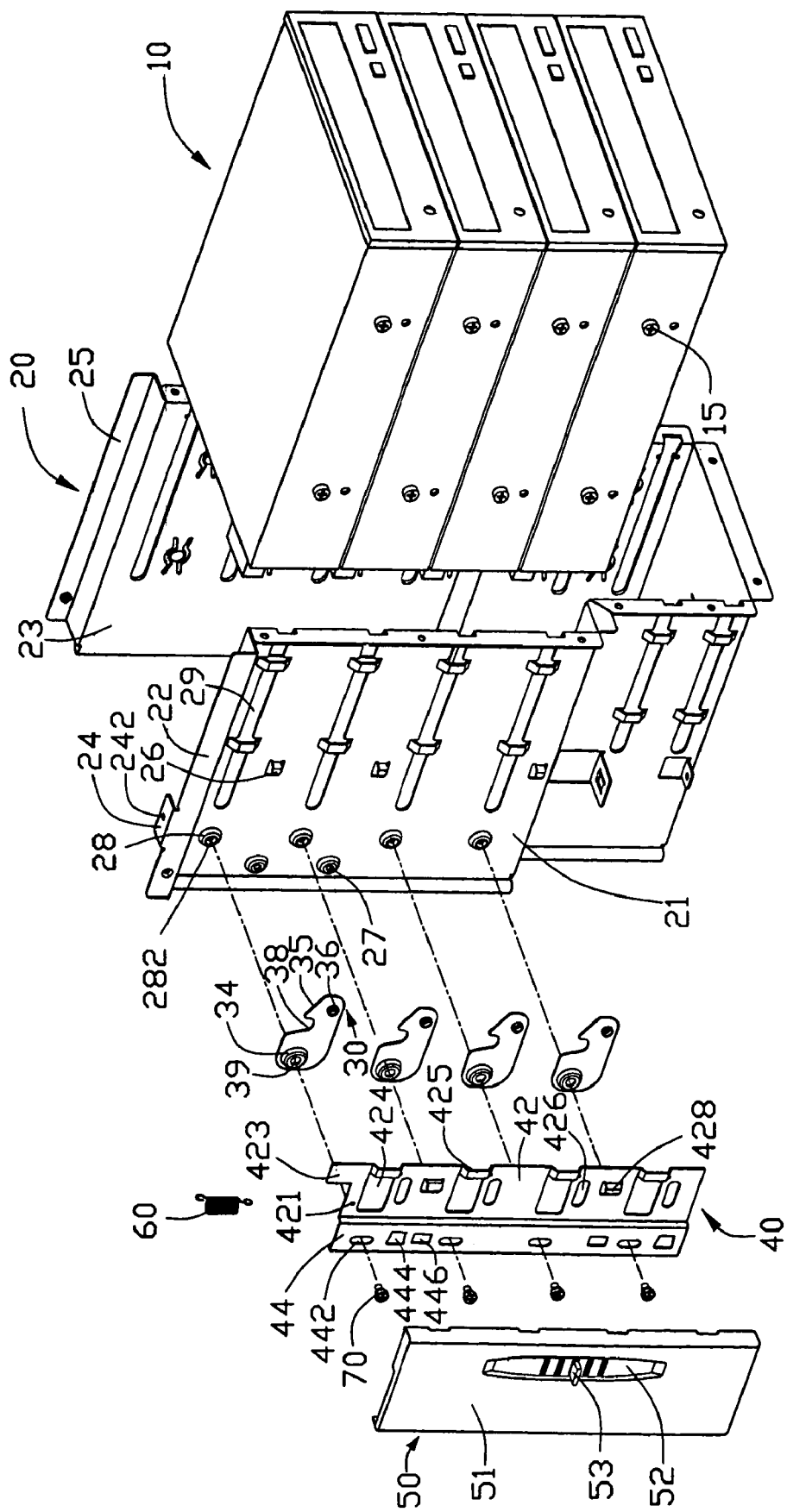
FIG. 1 is an exploded, isometric view of a mounting apparatus in accordance with the present invention, together with a plurality of data storage devices.
Figure 2:
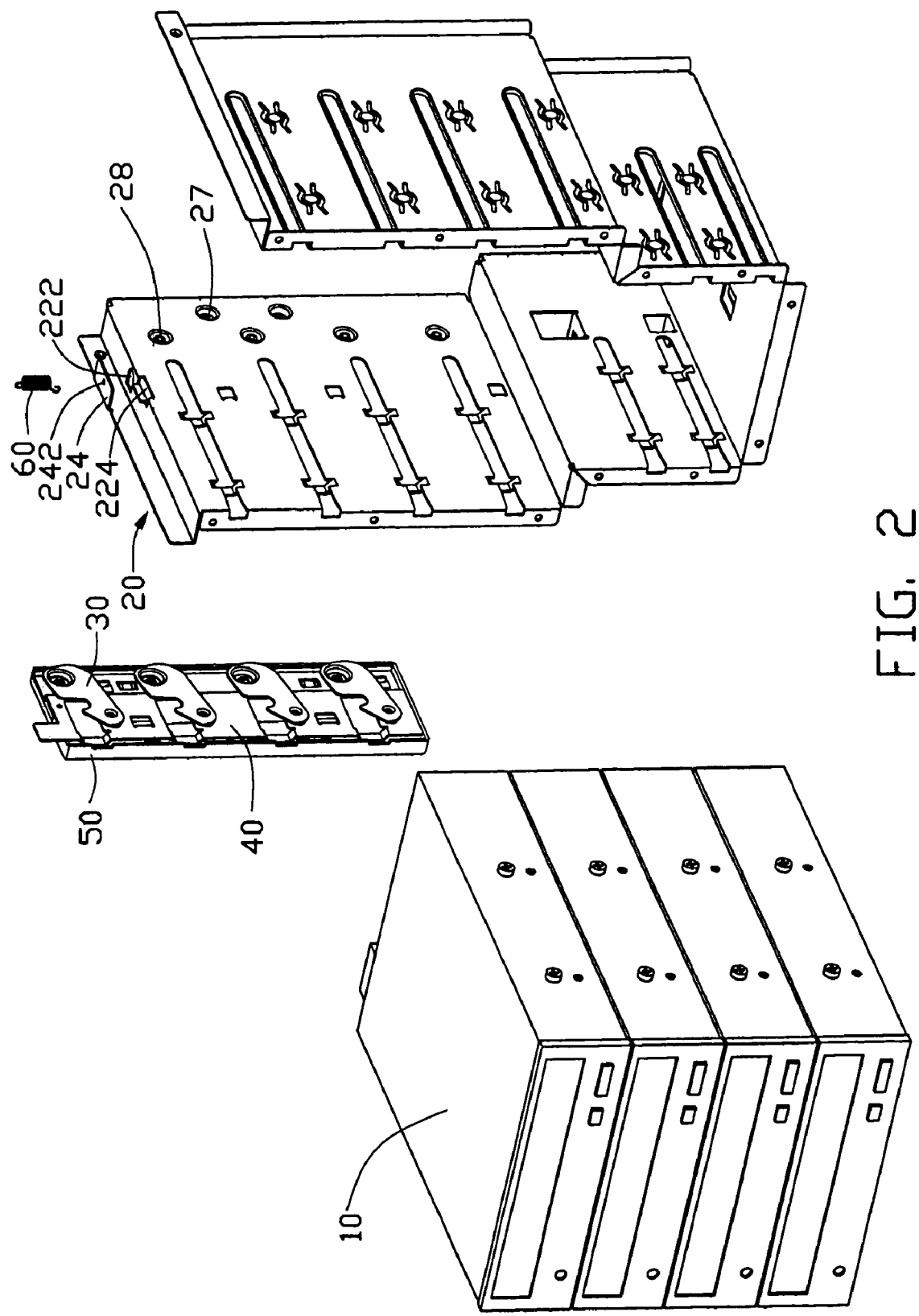
FIG. 2 is similar to FIG. 1, but viewed from another aspect.
Figure 3:
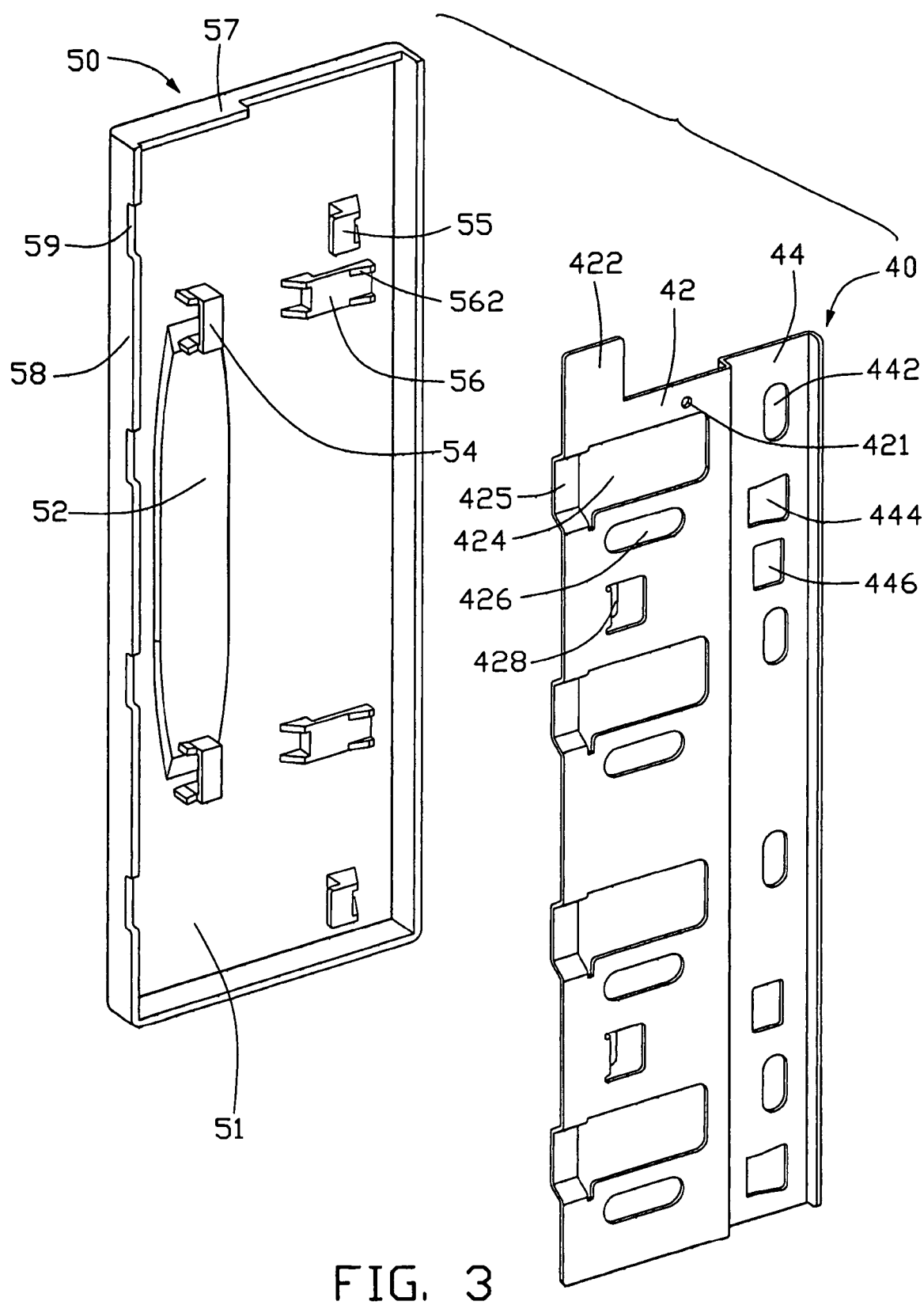
FIG. 3 is an inverted view of the second locking device and the third locking device.

Referring to FIGS. 1–3, a mounting apparatus in accordance with the preferred embodiment of the present invention is used for securing a plurality of data storage devices 10 to a drive bracket 20 of a computer chassis (not shown). The mounting apparatus comprises a plurality of first locking devices 30, a second locking device 40, a third locking device 50 attached to the second locking device 20, a spring 60 connecting the second locking device 40 and the drive bracket 20, and a plurality of screws 70.

A pair of studs 15 is formed on each sidewall of the data storage device 10.

The drive bracket 20 comprises a first sidewall 21 and a second sidewall 23. Two L-shaped rim 22, 25 are respectively extended from corresponding edges of the first sidewall 21 and the second sidewall 23. A supporting tab 24 is bent from a top edge of the rim 22 of the first sidewall 21, and a first linking hole 242 is defined in a middle portion of the supporting tab 24. The rim 22 of the first sidewall 21 comprises a connecting hole 224, and a through aperture 222 aligned with the first linking hole 242 of the supporting tab 24 to allow the spring 60 passing through. A plurality of first catches 26 and first bulges 27 is stamped outwardly from the first sidewall 21 for limiting the second locking device 40 to move vertically. A plurality of second bulges 28 is also formed on the first sidewall 21, and a screw hole 282 is defined in each of the second bulges 28 for attaching the first locking device 30. A plurality of opposite grooves 29 is respectively defined in the first and second sidewalls 21, 23 for slidably receiving the corresponding studs 15 of the data storage device 10.

Each first locking device 30 is a sheet of metal, and comprises a projecting portion 34 and a post 36 stamped outwardly therefrom. A slanted guiding portion 35 is formed on a top edge of the first locking device 30, and a cutout 38 is defined in a middle portion of the guiding portion 35. A through hole 39 is defined in the projecting portion 34.

The second locking device 40 comprises a main portion 42, and a track portion 44 extending in an offset manner from the main portion 42. The track portion 44 forms a receiving space for receiving the projecting portion 34 of the first locking device 30.

The main portion 42 of the second locking device 40 defines a second linking hole 421 in a top portion thereof.

The second linking hole 421 cooperates with the first linking hole 242 to fix the spring 60 therebetween. A guiding member 423 extends upwardly from the main portion 42. A plurality of parallel slots 424 is defined in the main portion 40 in alignment with the grooves 29 of the first sidewall 21. Each slot 424 has a reinforcing ribs 425 formed vertically thereon, and a structural strength of the slots 424 is thus enhanced. A horizontal aperture 426 is defined under each slot 424 for slidably receiving the post 36 of the first locking device 30. A plurality of second catches 428 is formed on the main portion 42 for attaching the third locking device 50 thereto.

The track portion 44 defines a plurality of vertical apertures 442 for the screws 70 extending therein for attaching the first locking device 30 and the second locking device 40 to the drive bracket 20. A plurality of locking holes 444 and receiving holes 446 are defined in the track portion 44 for attaching the third locking device 50 thereto.

The third locking device 50 is generally a rectangular cover and comprises a base plate 51. An operation portion 52 is stamped along a direction toward the drive bracket from the base plate 51. A handle 53 vertically extends from the operation portion 52. A plurality of fixing blocks 54 extends along the direction toward the drive bracket from the base plate 51 corresponding with the second catches 428. A plurality of third catches 55 extends from the base plate 51 corresponding with the locking holes 444 of the second locking device 40, and a plurality of cantilevered resilient portions 56 formed from the base plate 51. The resilient portion 56 comprises a free stop end and a projection 562 extending from the stop end for engaging in the receiving hole 446 of the second locking device 40. A top of the third locking device 50 comprises a step 57 corresponding to the second locking device 40. A plurality of concaves 59 is defined in a side of the third locking device 50 for allowing the studs 15 to pass through.

Figure 4:
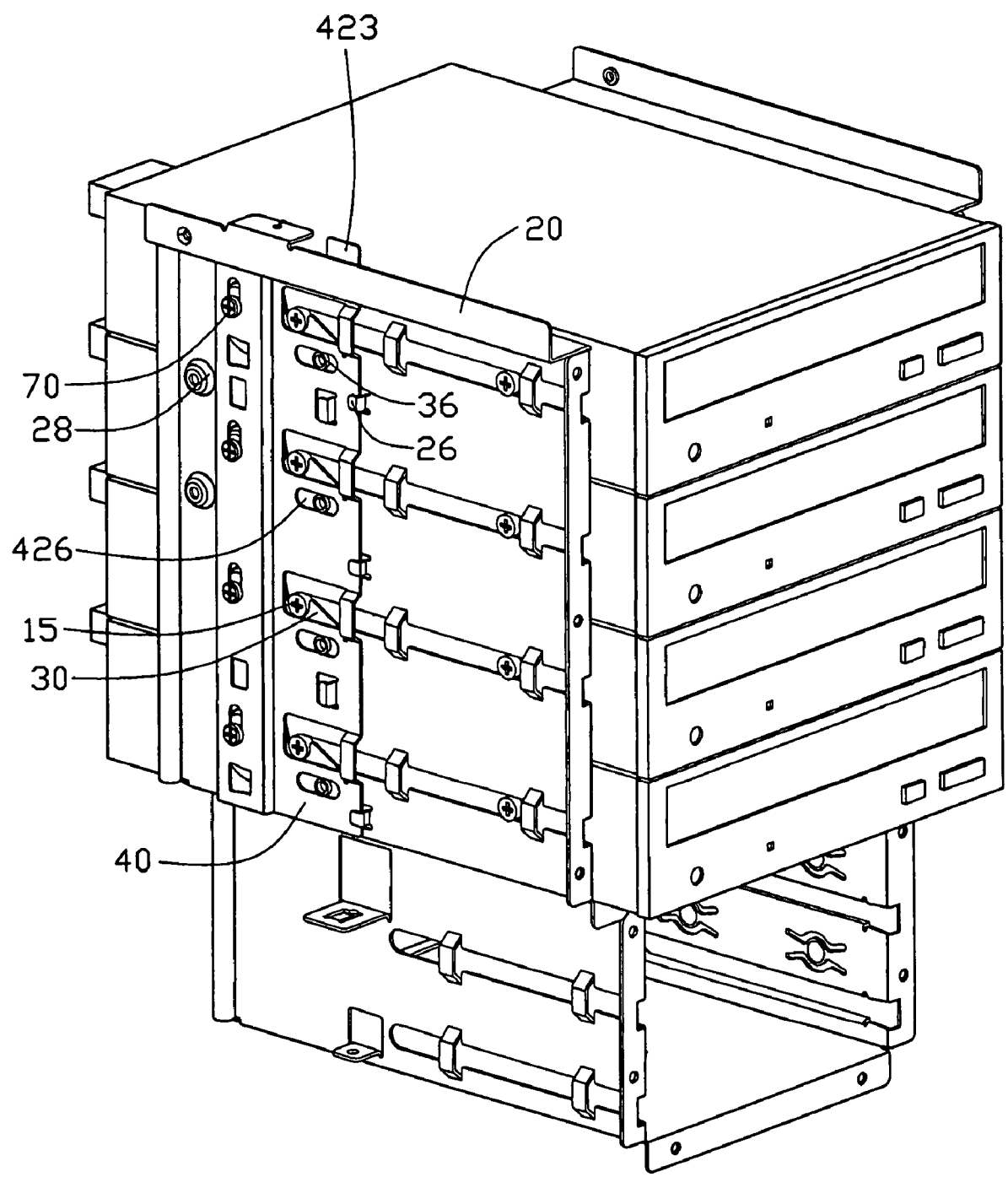
FIG. 4 is an isometric view of the mounting apparatus of FIG. 1, showing the first locking device and the second locking device attached on the bracket.

Referring also to FIG. 4, in assembly, the posts 36 of the first locking devices 30 are received in the horizontal apertures 426 of the second locking device 40, the through holes 39 face to the vertical apertures 442, and the guiding member 423 extends upwardly through the connecting hole 224 of the first sidewall 21. Then the screws 70 extend through the vertical apertures 442 and the through holes 39, and are locked in the screw holes 282 of the drive bracket 20. The second locking device 40 is limited between the first bulges 27 and the first catches 26. The spring 60 is arranged between the first linking hole 242 and the second linking hole 421, so that the second locking device 40 is movably attached to the first sidewall 21 of the drive bracket 20.

Figure 5:
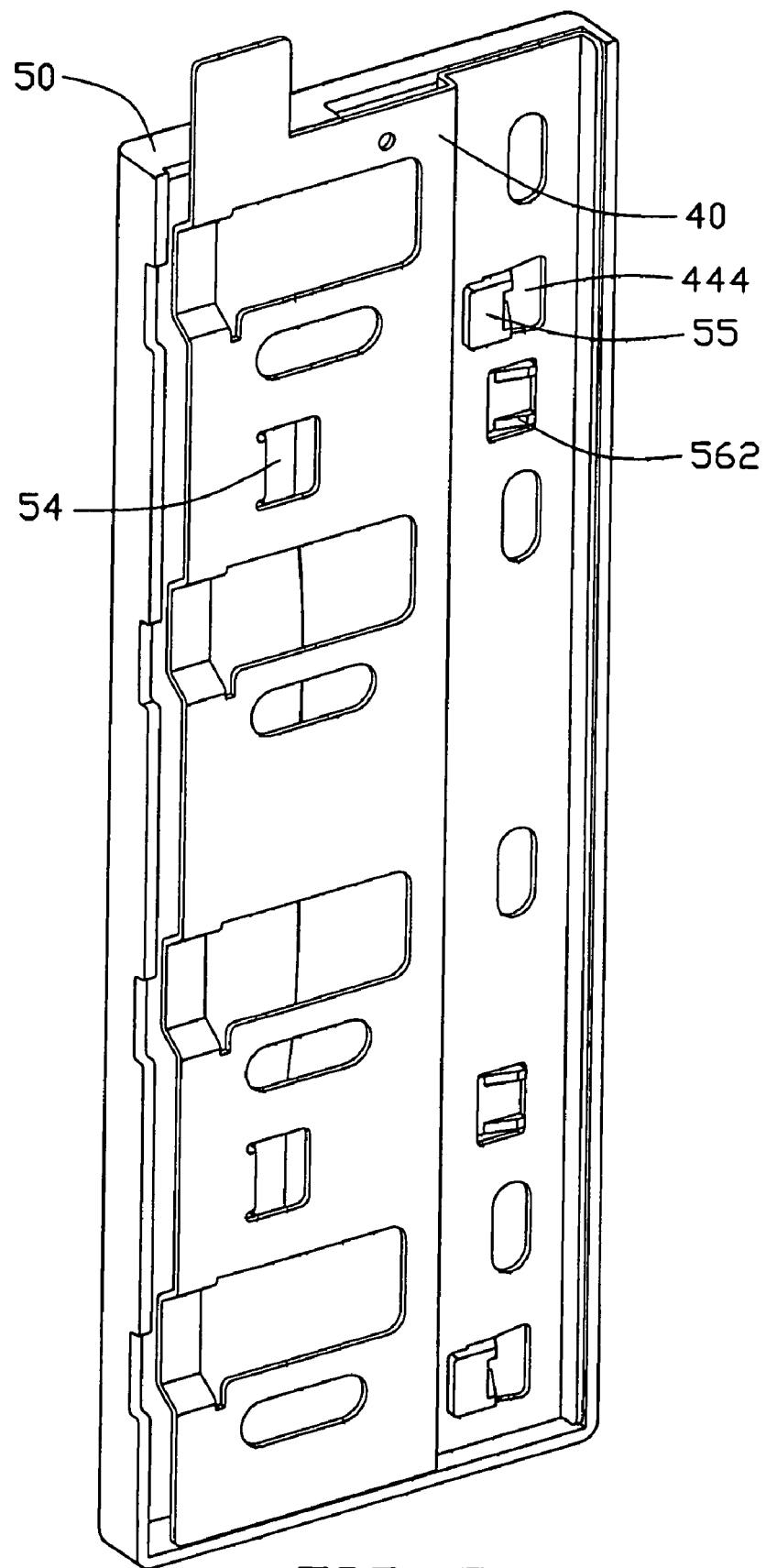
FIG. 5 is similar to FIG. 3, but showing the second locking device and the third locking device mounting together.

Referring to FIG. 5, the third catches 55 of the third locking device 50 are in alignment with the corresponding locking holes 444 of the second locking device 40. Then the third locking device 50 is forced toward the second locking device 40 and then moved forwardly to engage the third catches 55 in the locking holes 444 of the second locking device 40. The resilient portions 56 are compressed aside during the movement and then spring back when the projections 562 snap into corresponding receiving holes 446 of the second locking device 40. The second catches 428 are engagingly received in the fixing blocks 54 during the movement as well.

Figure 6:
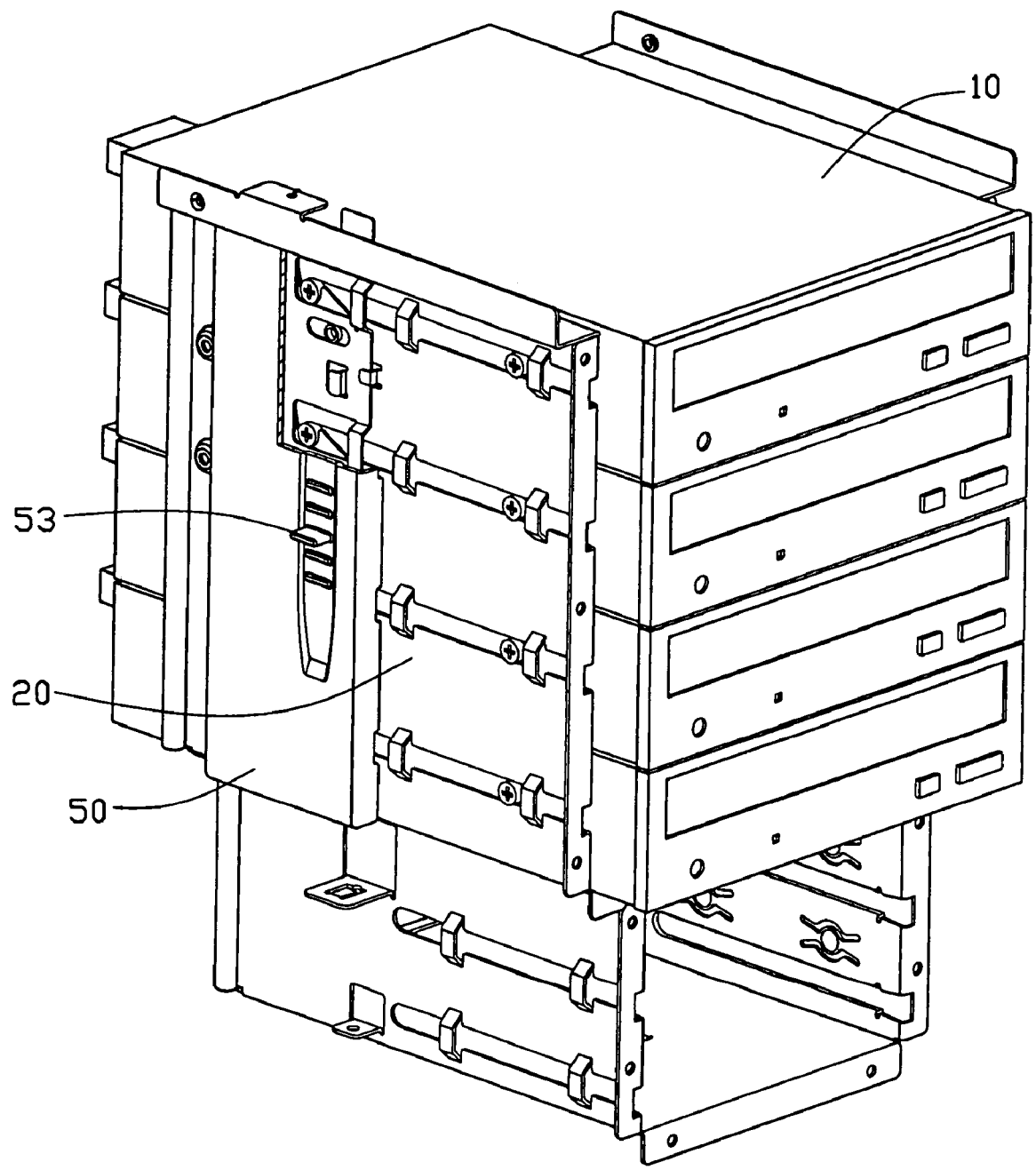
FIG. 6 is an assembled view of FIG. 1.
Figure 7:
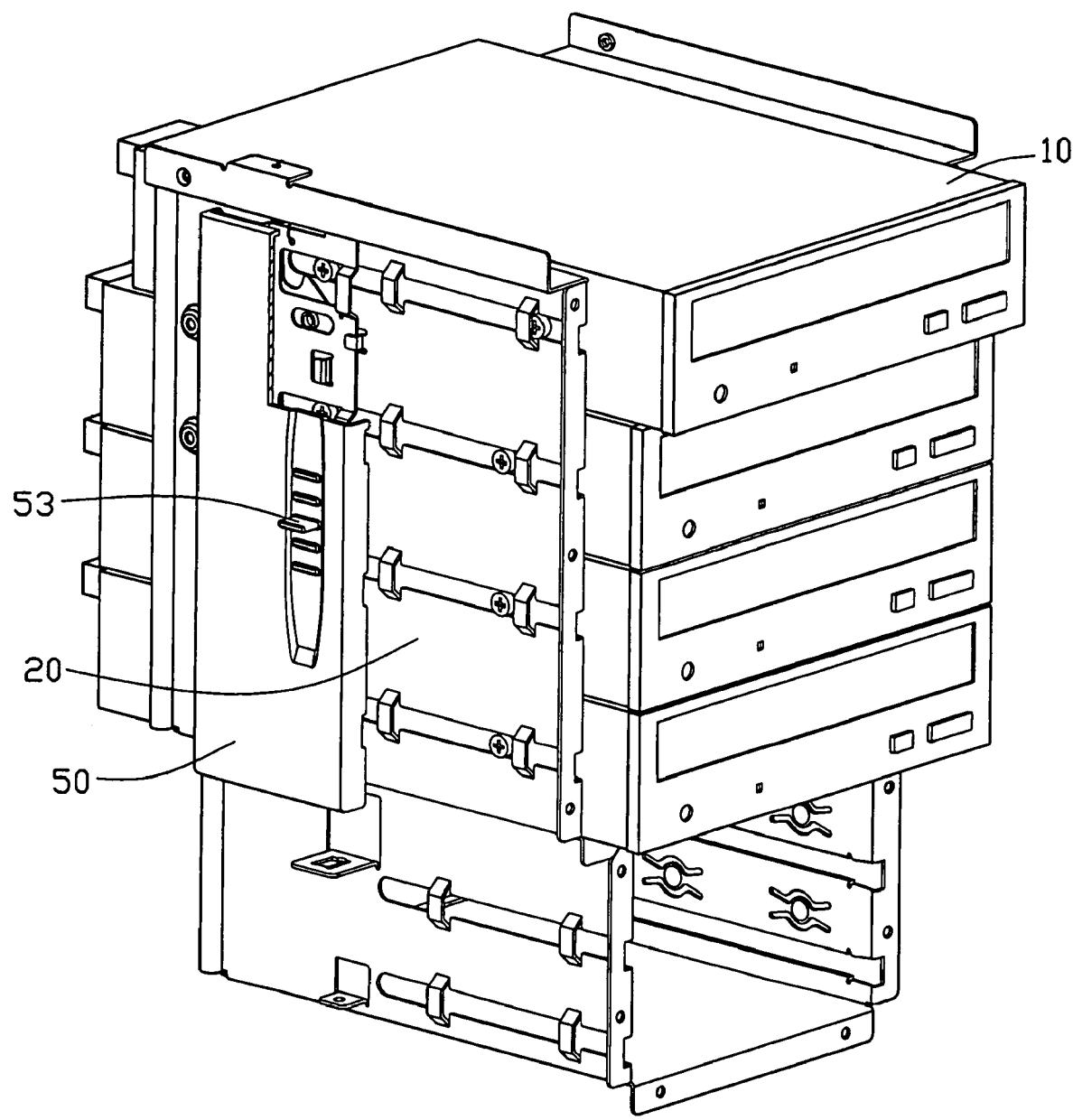
FIG. 7 is an disassembled view of FIG. 1.

Referring also to FIGS. 6–7, in use, the data storage devices 10 are moved into the drive bracket 20. The studs 15 of the data storage devices 10 respectively enter the corresponding grooves 29 of the drive bracket 20. When a leading stud 15 of each data storage device 10 exerts a force on the guiding portion 35 of a corresponding first locking device 30 due to the movement of the data storage device, the first locking device 30 pivots about the screws 70 and the second locking device 40 is pressed downwardly because of the post 36 received in the horizontal aperture 426, and the spring 60 is stretched. When the leading stud 15 reaches a corresponding stop end of the groove 29, the leading stud 15 is moved over the guiding portion 35 and slides into the cutout 38 of the first locking device 30. At the same time, the spring 60 restores, and the second locking device 40 returns to its original position. Thus, the leading stud 15 is fixedly received in the cutout 38 of the first locking device 30, thereby securing the data storage device 30 within the drive bracket 10.

In removal of the data storage device 10, the handle 53 is pressed downwardly for driving the second locking device 40 to move downwardly and cause the spring 60 to be stretched, and the first locking device 30 is pivoted about the screw 70 due to the movement of the second locking device 40. When a highest point of the guiding portion 35 is below the stud 15, the stud 15 is freely released from the cutout 38 of the first locking device 30. Then, the data storage device 10 is readily moved out from the drive bracket 20.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting apparatus for securing a data storage device having a plurality of studs arranged at opposite sides thereof, the mounting apparatus comprising:
   a drive bracket for installing the data storage device therein, the drive bracket comprising a sidewall defining a groove for slidably receiving a corresponding stud of the data storage device;
   a first locking device pivotally attached to the sidewall of the drive bracket, the first locking device comprising a post formed outwardly therefrom, and a cutout defined therein;
   a second locking device movably attached to the sidewall of the drive bracket, the second locking device defining a horizontal aperture, the post of the first locking device slidably received in the horizontal aperture; and
   a resilient element arranged between the first sidewall and the second locking device;
   wherein said stud is slid along the groove and engages into the cutout, thereby securing the data storage device within the drive bracket; in disassembly, the second locking device is moved so that the first locking device is pivoted, and said stud is released from the cutout, thereby readily removing the data storage device from the drive bracket.

2. The mounting apparatus as described in claim 1, wherein the first locking device forms a slanted guiding portion in front of the cutout.

3. The mounting apparatus as described in claim 1, wherein a plurality of first catches and first bulges is stamped outwardly from the first sidewall adapted for limiting the second locking device to move vertically.

4. The mounting apparatus as described in claim 1, wherein the second locking device defines a vertical aperture, the first locking device defines a through hole, the sidewall of the drive bracket defines a screw hole, a screw extends through the vertical aperture and the through hole and engages in the screw hole of the drive bracket.

5. The mounting apparatus as described in claim 4, wherein the first locking device comprises a projecting portion with the through hole defined therein, the second locking device comprises a main portion and a track portion extending in an offset manner from the main portion to define a receiving space for receiving the projecting portion of the first locking device.

6. The mounting apparatus as described in claim 1, wherein a rim extends outwardly and then upwardly from a top edge of the sidewall, a supporting tab defining a first linking hole therein is bent from the rim of the first sidewall, the rim defines a through aperture corresponding to the first linking hole of the supporting tab.

7. The mounting apparatus as described in claim 6, wherein the second locking device defines a second linking hole in a top thereof corresponding with the first linking hole to fix the spring.

8. The mounting apparatus as described in claim 6, wherein the rim of the sidewall comprises a connecting hole, a guiding member forms upwardly from the main portion of the second locking device to extend through the connecting hole.

9. The mounting apparatus as described in claim 1, further comprising a third locking device attached to the second locking device, a handle is formed outwardly from the third locking device.

10. The mounting apparatus as described in claim 9, wherein the second locking device comprises a plurality of second catches and a plurality of locking holes, the third locking device comprises a plurality of fixing blocks corresponding with the second catches and a plurality of third catches corresponding with locking holes of the second locking device for attaching the third locking device.

11. A mounting apparatus comprising:
at least one data storage device having a plurality of studs arranged on opposite sides thereof;
a drive bracket for installing said data storage device therein, the drive bracket comprising a first sidewall and a second sidewall defining a pair of grooves for slidably receiving the studs of said data storage device;
at least one first locking device pivotally mounted on the first sidewall, said first locking device comprising a post, and a cutout corresponding to the groove of the first sidewall of the bracket;
a second locking device movably attached to the drive bracket, the second locking device defining at least one horizontal aperture, and the post of said first locking device slidably received in said horizontal aperture;
a spring arranged between the first sidewall and the second locking device;
wherein when the studs of said data storage device are slid into the grooves, one of the studs is slid into the cutout and sandwiched between a side of the cutout and the end of said groove, thereby securing said data storage device within the drive bracket; when the second locking device is pressed, the first locking device is moved corresponding to the first locking device, and said one of the studs is released from the cutout, thereby readily removing said data storage device from the drive bracket.

12. The mounting apparatus as described in claim 11, wherein said first locking device forms a slanted guiding portion in front of the cutout.

13. The mounting apparatus as described in claim 11, wherein the second locking device defines at least one vertical aperture, said first locking device defines a through hole, the first sidewall of the drive bracket defines at least one screw hole, a screw extends through said vertical aperture and the through hole and engages in said screw hole of the drive bracket.

14. The mounting apparatus as described in claim 11, wherein further comprising a third locking device attached to the second locking device, a handle is formed outwardly from the third locking device.

15. A mounting assembly comprising:
a bracket defining at least one groove in one of opposite sidewalls thereof;
a device slidably accommodated in the bracket, the device having at least one stud at one side thereof corresponding to said groove of the bracket;
a first locking device rotatably attached to said sidewall of the bracket, the first locking device comprising a post extending outwardly therefrom, a slanted guiding portion and a cutout defined next to the guiding portion;
a second locking device movably attached to said sidewall of the bracket, and being connected to said sidewall with a resilient element, the second locking device defining an elongated aperture to receive the post of the first locking device;
wherein said stud of the device slides in said groove of the bracket, rides along the guiding portion to rotate the first locking device and move the second locking device, and then is blocked by the cutout from backward moving;
wherein the second locking device is moved to rotate the first locking device, so that said stud is released from the cutout.

* * * * *